United States Patent
Navarro et al.

(10) Patent No.: US 10,316,127 B2
(45) Date of Patent: **\*Jun. 11, 2019**

(54) PROCESS OF MANUFACTURING A MULTISTAGE POLYMER, ITS COMPOSITION, ITS USE AND COMPOSITION COMPRISING IT

(71) Applicant: Arkema France, Colombes (FR)

(72) Inventors: Christophe Navarro, Bayonne (FR); Aline O. Couffin, Balsac (FR); Rosangela Pirri, Montardon (FR); Frederic Malet, Lyons (FR)

(73) Assignee: Arkema France, Colombes (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/527,406

(22) PCT Filed: Nov. 24, 2015

(86) PCT No.: PCT/EP2015/077515
§ 371 (c)(1),
(2) Date: May 17, 2017

(87) PCT Pub. No.: WO2016/083383
PCT Pub. Date: Jun. 2, 2016

(65) Prior Publication Data
US 2017/0355802 A1     Dec. 14, 2017

(30) Foreign Application Priority Data
Nov. 24, 2014   (FR) ..................................... 14 61388

(51) Int. Cl.
*C08L 67/00*     (2006.01)
*C08F 279/06*    (2006.01)
*C08F 279/02*    (2006.01)
*C08L 51/04*     (2006.01)

(52) U.S. Cl.
CPC .......... *C08F 279/06* (2013.01); *C08F 279/02* (2013.01); *C08L 51/04* (2013.01); *C08L 67/00* (2013.01)

(58) Field of Classification Search
CPC .......... C08F 279/02; C08F 6/22; C08L 31/04; C08L 33/10; C08L 33/08; C08L 51/04; C08L 2201/50; C08L 2666/40
See application file for complete search history.

(56) References Cited

U.S. PATENT DOCUMENTS

| | | | |
|---|---|---|---|
| 4,104,328 A * | 8/1978 | Swoboda et al. | C08F 36/06 525/78 |
| 5,290,867 A | 3/1994 | Gilg et al. | |
| 6,545,089 B1 | 4/2003 | DeRudder et al. | |
| 2003/0203990 A1 | 10/2003 | DeRudder et al. | |
| 2009/0239991 A1 | 9/2009 | Avtomonov et al. | |
| 2010/0130643 A1 | 5/2010 | Rohrbach | |
| 2012/0157630 A1 | 6/2012 | Navarro et al. | |
| 2017/0355801 A1* | 12/2017 | Couffin et al. | C08F 6/22 |

FOREIGN PATENT DOCUMENTS

JP          2005 248096 A2    9/2005
WO     WO 2009/126373 A2    10/2009

OTHER PUBLICATIONS

Hitachi High Tech Application Brief, TA No. 68 Aug. 1995 taken from the World Wide Web on Jul. 31, 2018, as evidence. found at: https://www.hitachihightech.com/file/global/pdf/products/science/appli/ana/thermal/application_TA_068e.pdf.*
Polymer Database taken from the World Wide Web Jul. 31, 2018 http://polymerdatabase.com/polymers/polya-methylstyrene.html.*
Wikipedia article to Poly(methyl methacrylate) taken from the World Wide Web Jul. 31, 2018 and accessible at: https://en.wikipedia.org/wiki/Poly(methyl_methacrylate).*

\* cited by examiner

*Primary Examiner* — Nathan M Nutter
(74) *Attorney, Agent, or Firm* — Lynn B. Morreale

(57) ABSTRACT

The present invention relates to a multistage polymer, its composition, its process of preparation, and its use as impact modifier in thermoplastic compositions. More particularly the present invention relates to a process for manufacturing a polymer composition comprising a multistage polymer and its use as impact modifier in thermoplastic compositions.

19 Claims, No Drawings

PROCESS OF MANUFACTURING A MULTISTAGE POLYMER, ITS COMPOSITION, ITS USE AND COMPOSITION COMPRISING IT

CROSS-REFERENCE TO RELATED APPLICATIONS

This application is a national stage application under 35 U.S.C. § 371 of PCT/EP2015/077515, filed Nov. 24, 2015 which claims benefit to application FR14.61388, filed Nov. 24, 2014.

FIELD OF THE INVENTION

The present invention relates to a multistage polymer, its composition and its process of preparation.

In particular present invention it relates to a multistage polymer, its composition and its process of preparation and its use as impact modifier in thermoplastic compositions.

More particularly the present invention relates to a process for manufacturing a polymer composition comprising a multistage polymer and its use as impact modifier in thermoplastic compositions.

TECHNICAL PROBLEM

Impact modifiers are widely used to improve the impact strength for thermoplastic compositions with the aim to compensate their inherent brittleness or the embrittlement that occurs at sub zero temperatures, notch sensitivity and crack propagation. So an impact modified polymer is a polymeric material whose impact resistance and toughness have been increased by the incorporation of phase micro domains of a rubbery material.

This is usually done due to the introduction at microscopic rubber particles into the polymer matrix that can absorb the energy of an impact or dissipate it. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix.

The performance of the impact modification is a function of the particles size, especially of the rubber part of the particle, and its quantity. There is an optimal average particle size in order to have the highest impact strength for a given quantity of added impact modifier particles.

These primary impact modifier particles are usually added in form of powder particles to the thermoplastic material. These powder particles are agglomerated primary impact modifier particles. During the blending of the thermoplastic material with the powder particles the primary impact modifier particles are regained and are dispersed more or less homogenously dispersed in the thermoplastic material.

While the particle size of the impact modifier particles in the range of nanometers, the range of the agglomerated powder particles is in the range of micrometers.

Agglomeration during the recovery can be obtained by several processes, as for example, spray drying, coagulation through addition of salts or shearing, freeze drying or combination of spray drying and coagulation techniques. It is important to avoid negative influence of the impact modifier powder on the thermoplastic polymer composition to which the impact modifier is added. As negative influence, it is understood, for example the color stability, the thermal stability, the hydrolysis stability of the thermoplastic polymer comprising the impact modifier either on function of the time or the temperature or both.

All these influences might occur due to the architecture of the core-shell but more particularly the impurities and side products employed during the synthesis and treatment of the impact modifier powder. Usually, there is no special purification step of the impact modifier, just a separation of solid versus liquid. Therefore more or less important quantities of any chemical compound (impurities, by-products) employed are still incorporated in the impact modifier. The concerned quantities of them may vary. However these chemical compounds should not influence at all or have only a minor influence on the thermoplastic material in a major way as for example degradation of optical and/or mechanical and/or rheological properties with time and/or temperature and/or hygrometry.

Extensive washing or purification might get rid of some of the compounds coming from impurities or products used during the synthesis that might have negative influence of the impact modifier powder on the performance thermoplastic polymer composition.

On the other hand all processes are extremely cost sensitive. A slight improvement in process can result in a significant market advantage.

The objective of the present invention is to propose a multistage polymer having a satisfying thermal stability.

An additional objective of the present invention is also to have a multistage polymer having a satisfying thermal stability that can be used as impact modifier.

Still another objective of the present invention is to propose a process for manufacturing a multistage polymer having a satisfying thermal stability.

An additional objective the present invention is a thermoplastic composition comprising a multistage polymer, said composition is having a satisfying thermal stability.

BACKGROUND OF THE INVENTION

PRIOR ART

The document JP-A1-2005-248096 describes a method for manufacturing a transparent thermoplastic resin with improved colour. A graft polymer latex is prepared by graft-polymerizing followed by coagulating the latex with an inorganic salt of alkali-earth metal in order to recover a product in a form of powder. An alkali metal salt of phosphoric acid is added previously in said graft polymer latex.

The document U.S. Pat. No. 5,290,867 describes a process for producing an emulsion graft copolymer, which comprises grafting a vinyl aromatic monomer and a comonomer onto a robber latex in the presence of an iron (II) redox system as polymerization catalyst and coagulating the graft copolymer latex with an alkaline earth metal compound, characterized in that the pH of the coagulated slurry is adjusted to a value ranging from 8 to 12.

The document WO2009/126373 discloses functional MBS impact modifiers synthesized by a multistage emulsion polymerization. At the end of the synthesis the reaction mixture obtained is coagulated in order to separate the polymer. The coagulating treatment is performed by bringing into contact the reaction mixture with a saline solution (calcium chloride or aluminum chloride—$CaCl_2$ or $AlCl_3$) or a solution acidified with concentrated sulfuric acid and then to separate, by filtration, the solid product resulting from the coagulating, the solid product then being washed and dried to give a graft copolymer as a powder.

The document EP2465882 discloses improved impact modified thermoplastic compositions. The thermoplastic compositions comprise a polymeric impact modifier with a core-shell structure made by a multistage process and recovered by a special process controlling and adjusting the pH value. Coagulation is done with salts and preferably magnesium sulfate.

The document EP2189497 discloses polymer compositions containing phosphates and especially the process for obtaining them. The polymer composition is a polymer obtained by a multi stage process and is an impact modifier. The phosphate salts are introduced in order to reduce or eliminate the deleterious effects of the multivalent cations that are present in polymer obtained by a multi stage process. The use of such a process allows a coagulated polymer to be used as an impact additive to a matrix without causing the deleterious effects from the multivalent cation that would otherwise have occurred.

The document WO2009/118114 describes an impact modified polycarbonate composition with a good combination of color, hydrolysis and melt stability. The rubber core is based on polybutadiene. For the preparation of the graft rubber polymer salts of fatty acids, especially of carboxylic acids are used. The yellow index of the compositions given with injection temperature at 260° C. is quite important: 20 or higher.

In the prior art the coagulation is made with multivalent cations as the polymer is easier much easier coagulated. The present invention uses alkali metal cations for coagulation.

BRIEF DESCRIPTION OF THE INVENTION

Surprisingly it has been found that a process for manufacturing a polymer composition comprising a multistage polymer comprising the steps of
a) polymerizing by emulsion polymerization of a monomer or monomer mixture ($A_m$) to obtain during this stage one layer (A) comprising polymer (A1) having a glass transition temperature of less than 0° C.,
b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
c) coagulating the multistage polymer with an alkali metal salt,
d) washing the multistage polymer,
e) adjusting the pH value after the coagulation to a value between 5 to 10,
f) addition of an aqueous solution or dispersion comprising a phosphorus containing compound wherein the phosphorus has the oxidation stage of +III or +V,
yields to a polymer powder having satisfying thermal aging properties.

Surprisingly it has also been found that a thermoplastic composition comprising a multistage polymer obtained by a process for manufacturing a polymer composition comprising a multistage polymer comprising the steps of
a) polymerizing by emulsion polymerization of a monomer or monomer mixture ($A_m$) to obtain during this stage one layer (A) comprising polymer (A1) having a glass transition temperature of less than 0° C.,
b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
c) coagulating the multistage polymer with an alkali metal salt,
d) washing the multistage polymer,
e) adjusting the pH value after the coagulation to a value between 5 to 10,
f) addition of an aqueous solution or dispersion comprising a phosphorus containing compound wherein the phosphorus has the oxidation stage of +III or +V,
yields to a thermoplastic composition having satisfying thermal aging properties.

DETAILED DESCRIPTION OF THE INVENTION

In a first aspect the present invention relates to a process for manufacturing a polymer composition comprising a multistage polymer comprising the steps of
a) polymerizing by emulsion polymerization of a monomer or monomer mixture ($A_m$) to obtain during this stage one layer (A) comprising polymer (A1) having a glass transition temperature of less than 0° C.,
b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
c) coagulating the multistage polymer with an alkali metal salt,
d) washing the multistage polymer,
e) adjusting the pH value after the coagulation to a value between 5 to 10,
f) addition of an aqueous solution or dispersion comprising a phosphorus containing compound wherein the phosphorus as the oxidation stage of +III or +V.

According to a second aspect, the present invention relates to a thermoplastic composition comprising a multistage polymer obtained by a process for manufacturing a polymer composition comprising said multistage polymer comprising the steps of
a) polymerizing by emulsion polymerization of a monomer or monomer mixture ($A_m$) to obtain during this stage one layer (A) comprising polymer (A1) having a glass transition temperature of less than 0° C.,
b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
c) coagulating the multistage polymer with an alkali metal salt,
d) washing the multistage polymer,
e) adjusting the pH value after the coagulation to a value between 5 to 10,
f) addition of an aqueous solution or dispersion comprising a phosphorus containing compound wherein the phosphorus has the oxidation stage of +III or +V.

By the term "polymer powder" as used is denoted a polymer comprising powder grain in the range of at least 1 micrometer (μm) obtained by agglomeration of primary polymer comprising particles in the nanometer range.

By the term "primary particle" as used is denoted a spherical polymer comprising particle in the nanometer range. Preferably the primary particle has a weight average particle size between 50 nm and 500 nm.

By the term "particle size" as used is denoted the volume average diameter of a particle considered as spherical.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic polymer comprises essentially polymers comprising (meth)acrylic monomers that make up 50 wt % or more of the (meth)acrylic polymer.

By the term "impact modifier" as used is denoted a compound comprising an elastomer or rubber that can be added or incorporated in a thermoplastic compound to improve its impact resistance.

By the term "rubber" as used is denoted the thermodynamic state of the polymer above its glass transition.

With regard to the multistage polymer of the invention, it is a polymer particle having a multilayer structure comprising at least one layer (A) comprising a polymer (A1) having a glass transition temperature below 0° C. and at least another layer (B) comprising a polymer (B1) having a glass transition temperature over 45° C.

The ratio of layer (A)/layer (B) in the multistage polymer is not particularly limited, but preferably it is in a range in weight between 10/90 and 95/5, more preferably 40/60 and 95/5 advantageously 60/40 to 90/10 and most advantageously between 70/30 and 90/10.

The polymer particle having a multilayer structure is spherical. The polymer particle having a multilayer structure is also called the primary particle. The polymer particle has a weight average particle size between 20 nm and 500 nm. Preferably the weight average particle size of the polymer particle is between 50 nm and 400 nm, more preferably between 75 nm and 350 nm and advantageously between 80 nm and 300 nm.

The polymer particle according to the invention is obtained by a multistage process such as two or three stages or more stages.

Preferably the polymer (A1) having a glass transition temperature below 0° C. in the layer (A) is not made during the last stage of the multistage process. The polymer (A1) is having a glass transition temperature below 0° C. in the layer (A) never forms the external layer or outer shell of the polymer particle having the multilayer structure.

Preferably the polymer (B1) having a glass transition temperature above 45° C. in the layer (B) is the external layer of the polymer particle having the multilayer structure.

There could be additional intermediate layers made by intermediate steps between the polymer (A1) having a glass transition temperature below 0° C. in the layer (A) and the layer (B) comprising a polymer (B1) having a glass transition temperature over 45° C. This would lead to a multilayered particle.

The glass transition temperature (Tg) of the polymer (A1) is less than 0° C., preferably less than −10° C., advantageously less than −20° C. and most advantageously less than −25° C. and more advantageously less than −40° C.

More preferably the glass transition temperature Tg of the polymer (A1) is between −120° C. and 0° C., even more preferably between −90° C. and −10° C. and advantegeously between −80° C. and −25° C.

Preferably the glass transition temperature Tg of the polymer (B1) is between 45°0 C. and 150° C. The glass transition temperature of the polymer (B1) is more preferably between 60° C. and 150° C., still more preferably between 80° C. and 150°0 C. and advantageously between 90° C. and 150° C.

The glass transition temperature Tg can be estimated for example by dynamic methods as thermo mechanical analysis.

The polymer composition of the invention in form of polymeric particles of a multistage polymer can also be in form of a polymer powder. The polymer powder comprises agglomerated primary polymer particles made by the multistage process.

With regard to the polymer powder of the invention, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 800 μm and preferably 500 μm, more preferably at most 350 μm.

With regard to the polymer (A1), mention may be made of homopolymers and copolymers comprising monomers with double bonds and/or vinyl monomers.

In a first embodiment the polymer (A1) is chosen from isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a specific embodiment polymer (A1) is a butadiene homopolymer.

In a second embodiment the polymer (A1) is a (meth) acrylic polymer. A (meth) acrylic polymer according to the invention is a polymer comprising at least 50 wt % preferably at least 60 wt % and more preferably at least 70 wt % of monomers coming from acrylic or methacrylic monomers. The (meth) acrylic polymer according to the invention comprise less than 50 wt % preferably less than 40 wt % and more preferably less than 30 wt % of non acrylic or methacrylic monomers, which can copolymerize with the acrylic or methacrylic monomers.

More preferably the polymer (A1) of the second embodiment comprises at least 70 wt % monomers chosen from C1 to C12 alkyl (meth)acrylates. Still more preferably the polymer (A1) comprises at least 80 wt % of monomers C1 to C4 alkyl methacrylate and/or C1 to C8 alkyl acrylate monomers.

Most preferably the acrylic or methacrylic monomers of the polymer (A1) are chosen from methyl acrylate, ethyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 0° C.

The polymer (A1) may be completely or partly cross-linked. All that is required is to add at least one difunctional monomer during the preparation of the polymer (A1). These difunctional monomers may be chosen from poly(meth) acrylic esters of polyols, such as butanediol di(meth)acrylate and trimethylolpropane trimethacrylate. Other multifunctional monomers are, for example, divinylbenzene, trivinylbenzene, and triallyl cyanurate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate. The crosslinking may also be carried out by using the intrinsic reactivity of the monomers, for example the case of the diene monomers.

With regard to the polymer (B1), mention may be made of homopolymers and copolymers comprising monomers with double bonds and/or vinyl monomers.

The polymer (B1) is chosen from styrene homopolymers, alkylstyrene homopolymers of methyl methacrylate homopolymers, or copolymers comprising at least 70 wt % of one of the above monomers and at least one comonomer chosen from the other above monomers, another alkyl (meth)acrylate, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid glycidyl methacrylate, hydroxyethyl methacrylate and alkyl(meth)acrylamides.

Preferably the polymer (B1) is also a (meth) acrylic polymer.

Preferably polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, butyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

The polymer (B1) may be crosslinked by adding at least one multifunctional monomer during the preparation of the polymer (B1).

The multistage polymer of the invention, having a multilayer structure comprising at least one layer (A) comprising a polymer (A1) having a glass transition temperature below 0° C. and another layer (B) comprising a polymer (B1) having a glass transition temperature over 45° C., comprises no voluntary added earth alkali metals neither as ions nor in form of salts.

By no voluntary added is meant that traces of earth alkali metals in form of ions or salts could be accidently added as a minor impurity with other ions or salts to the composition. Example notably impurities of calcium in sodium compounds are mentioned.

The earth alkali metals as traces or minor impurity present less than 30 ppm, preferably less than 20 ppm and more preferably less than 10 ppm and advantageously less than 9 ppm of the multistage polymer composition.

Furthermore multivalent cations present less than 50 ppm, preferably less than 40 ppm, more preferably less than 30 ppm, still more preferably less than 25 ppm and advantageously less than 20 ppm of the multistage polymer composition and preferably the final dry multistage polymer composition. Multivalent cations have the general formula $M^{b+}$, wherein M present the cation, with $b>1$, and preferably $5>b>1$.

The multivalent cations is the sum of all the eventually non-voluntary added traces of earth alkali metals in form of ions or salts and the eventually voluntary added multivalent cations. The voluntary added multivalent cations have the general formula $M^{b+}$, wherein M present the cation, with $b\geq 2$, and preferably $4\geq b\geq 2$. The voluntary added multivalent cations exclude earth alkali metals.

The multivalent cations including the earth alkali metals in the composition can be analysed by Inductively Coupled Plasma-Atomic Emission Spectroscopy (ICP-AES).

The multistage polymer of the invention, having a multilayer structure has a pH value between 5 and 10 and preferable 6 and 9 more preferable between 6 and 7.5 and advantageously between 6 and 7.

The multistage polymer of the invention comprises a phosphorus containing compound wherein the phosphorus has the oxidation stage of +III or +V.

The multistage polymer comprises at least 350 ppm, preferably at least 360 ppm, more preferably at least 370 ppm, still more preferably at least 380 ppm, advantageously at least 390 ppm and more advantageously at least 400 ppm of phosphorus that has the oxidation stage of +III or +V. The phosphorus is part of a phosphorus containing compound. The content of the phosphorus containing compound is calculated and expressed as phosphorus in view of the multistage polymer composition and not as phosphorus containing compound.

The multistage polymer comprises at most 2000 ppm, preferably at most 1900 ppm and more preferably at most 1800 ppm of phosphorus that has the oxidation stage of +III or +V. The phosphorus is part of a phosphorus containing compound.

The multistage polymer comprises between 350 ppm and 2000 ppm, preferable between 370 pmm and 1900 ppm and more preferably between 390 ppm and 1800 ppm of phosphorus that has the oxidation stage of +III or +V. The phosphorus is part of a phosphorus containing compound.

The quantity of phosphorus in the multistage polymer can be estimated by Inductively Coupled Plasma-Atomic Emission Spectroscopy (ICP-AES).

The oxidation stage is linked to the nature of the phosphorus containing compound added to the composition. Preferably there is no voluntary addition of any reducing or oxidizing agents, in order to change the oxidation stage of the phosphorus in the phosphorus containing compound.

The phosphorus containing compound is preferably chosen from organophosphorus compound, a phosphate salt, phosphoric acid, phosphonate salts, phosphonic acid and their respective esters and mixtures thereof.

By organophosphorus compound in the present invention are understood compounds with P—C and P—O—C bonds.

More preferably the phosphorus containing compound is chosen from organophosphorus compound having a P—O—C bond, a phosphate salt, phosphoric acid, phosphonate salts, phosphonic acid and ester and mixtures thereof.

Phosphate salts are salts that have as anion dihydrogenophosphate ($H_2PO_4^-$), hydrogenophosphate ($HPO_4^{2-}$) or phosphate ($PO_4^{3-}$)

Phosphonate salts are salts that have as anion dihydrogenophosphonate ($H_2PO_3^-$) or hydrogenophosphate ($HPO_3^{2-}$).

With regard to the process for manufacturing a polymer composition comprising a multistage polymer comprising the steps of
a) polymerizing by emulsion polymerization of a monomer or monomer mixture ($A_m$) to obtain during this stage one layer (A) comprising polymer (A1) having a glass transition temperature of less than 0° C.,
b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
c) coagulating the multistage polymer with an alkali metal salt,
d) washing the multistage polymer,
e) adjusting the pH value after the coagulation to a value between 5 to 10,
f) addition of an aqueous solution comprising a phosphorus containing compound wherein the phosphorus has the oxidation stage of +III or +V.

Preferably the process for manufacturing a polymer composition comprising the multistage polymer comprises the steps in the order as indicated.

Preferably in step d) the pH value is adjusted between 6 and 9, more preferable between 6 and 7.5 and advantageously between 6 and 7.

The process might comprise the additional step g) of drying the polymer composition. A dry polymer composition according to the invention is a composition that comprises less than 1% of humidity or water. The humidity of a polymer composition can be measure with a thermo balance.

The drying of the polymer can be made in an oven or vacuum oven with heating of the composition for 48 hours at 50° C.

The process of the invention, for manufacturing the polymer composition comprising the multistage polymer having a multilayer structure comprising at least one layer (A) comprising a polymer (A1) having a glass transition temperature below 0° C. and another layer (B) comprising a polymer (B1) having a glass transition temperature user 45° C., said process comprises no voluntary added earth alkali metals neither as ions nor in form of salts.

By no voluntary added is meant that traces of earth alkali metals in form of ions or salts could be accidently added as a minor impurity with other ions or salts during the respective process steps for manufacturing the composition. As examples notably impurities of calcium in sodium compounds are mentioned.

The earth alkali metals as traces or minor impurity present less than 30 ppm, preferably less than 20 ppm and more preferably less than 10 ppm and advantageously less than 9 ppm of the final multistage polymer composition and preferably the final dry multistage polymer composition.

Furthermore multivalent cations present less than 50 ppm, preferably less than 40 ppm, more preferably less than 30 ppm, still more preferably less than 25 ppm and advantageously less than 20 ppm of the multistage polymer composition. Multivalent cations have the general formula $M^{b+}$, wherein M present the cation, with b>1, and preferably 5>b>1.

The multivalent cations is the sum of all the eventually voluntary added traces of earth alkali metals in form of ions or salts and the eventually voluntary added multivalent cations. The voluntary added multivalent cations have the general formula $M^{b+}$, wherein M present the cation, with b≥2, and preferably 4≥b2. The voluntary added multivalent cations exclude earth alkali metals.

The respective monomers or monomer mixtures ($A_m$) and ($B_m$) for forming the layers (A) and (B) respectively comprising the polymers (A1) and (B1) respectively and the characteristics of the respective polymers (A1) and (B1) are the same as defined before for the definition of the polymers (A1) and (B1) for the composition.

The emulsion polymerization during the stage for layer (A) can be a grow-out process, a seeded grow-out process or an microagglomeration process.

Chain transfer agents are also useful in forming the polymer (A1). Useful chain transfer agents include those known in the art, including but limited to ter- dodecylmercaptan, n-dodecylmercaptan n-octylmercaptan, and mixtures of chain transfer agents. The chain transfer agent is used at levels from 0 to 2 percent by weight, based on the total core monomer content in monomer mixture ($A_m$).

Preferably the polymer (B1) is grafted on the polymer made in the previous stage.

Polymerization initiators useful in producing the polymer (A1) and (B1) include, but are not limited to a persulfate salt such as potassium persulfate, ammonium persulfate, and sodium persulfate; an organic peroxide such as tert-butyl hydroperoxide, cumene hydroperoxide, benzoyl peroxide, lauroyl peroxide, p-menthane hydroperoxide, and diisopropylbenzene hydroperoxide; an azo compound such as azobisisobutyronitrile, and azobisisovaleronitrile; or a redox initiator. However, it is preferable to use catalytic systems of redox type formed by the combination of a peroxide compound, for example as mentioned above, with a reducing agent, in particular such as alkali metal sulfite, alkali metal bisulfite, sodium formaldehyde sulfoxylate ($NaHSO_2HCHO$), a alkali salt of an organic sulfinic acid derivative, ascorbic acid, glucose, and in particular those of the said catalytic systems which are water-soluble, for example potassium persulfate/sodium metabisulfite or alternatively diisopropylbenzene hydroperoxide/sodium formaldehyde sulfoxylate or even more complicate systems as for example ferrous sulfate/dextrose/sodium pyrophosphate.

The initiators do not contain any voluntary added earth alkali metals (group IIA from the periodic system of elements). The initiator might contain however other multivalent cations that are not earth alkali metals.

For the emulsion polymerization during the two stages for making layer (A) comprising polymer (A1) and layer (B) comprising a polymer (B1) as emulsifying agent any one of the known surface-active agents, whether anionic, nonionic or even cationic may be used. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or dodecyl diphenyl ether disulfonic acid, potassium dodecyl diphenyl ether disulfonate, ammonium dodecyl diphenyl ether disulfonate and sodium dodecyl diphenyl ether disulfonate, or alternatively from nonionic surfactants, such as the reaction products of ethylene oxide and of alkylphenol or of aliphatic alcohols, alkylphenols. Use may also be made of mixtures of such surface-active agents, if necessary.

More preferably the emulsifying agent is chosen from an anionic surface-active agent.

Coagulation in step c) of the process of the invention is made by aggregation of the primary polymer particles at the end of emulsion polymerization by adding an aqueous electrolyte solution under stirring. Multivalent cations are to be avoided in the electrolyte solution. No multivalent cations are voluntary added to the electrolyte solution.

Preferably the coagulation is made with a solution comprising a salt of an alkali metal. More preferably the coagulation is made with a solution comprising a salt of an alkali metal that has solubility in water of at least 10 g/l.

More preferably the alkali metal salt is a sodium or potassium salt. For example the alkali metal salt can be chosen from NaCl, KCl, $Na_2SO_4$, $Na_3PO_4$ $Na_2HPO_4$, but is not limited on this list.

The washing in step d) of the process of the invention is made by water, diluted aqueous solutions or aqueous buffer solutions.

Adjusting the pH in step e) of the process of the invention is preferably made by adding sodium or potassium hydroxide or aqueous buffer solution after the coagulation step. After the adjusting step the pH is between 5 and 10, preferably between 6 and 9, more preferable between 6 and 7.5 and advantageously between 6 and 7.

Step f) concerns the addition of an aqueous solution or dispersion comprising a phosphorus containing compound wherein the phosphorus has the oxidation stage of +III or +V.

Preferably the step f) concerning the addition of an aqueous solution or dispersion comprising a phosphorus containing compound wherein the phosphorus has the oxidation stage of +III or +V is made after the coagulation step c).

In order to add aqueous solution or dispersion comprising a phosphorus containing compound, said the solution or dispersion is prepared by simple mixing of a known defined quantity of the phosphorus containing compound with water.

In one embodiment the aqueous solution or dispersion comprising the phosphorus containing compound wherein the phosphorus has the oxidation stage of +III or +V is added by washing the multistage polymer which contains less than 60 wt % of water with said aqueous solution or dispersion comprising a phosphorus containing compound wherein the phosphorus has the oxidation stage of +III or +V.

In a second embodiment the aqueous solution or dispersion comprising a phosphorus containing compound wherein the phosphorus has the oxidation stage of +III or +V is added on the wet cake after coagulation step and filtration step. After the filtration a wet cake is obtained that contains less than 60 wt % of water. Afterwards the wet cake is dried.

In a third embodiment the aqueous solution or dispersion comprising a phosphorus containing compound wherein the phosphorus has the oxidation stage of +III or +V is added during drying step of the multistage polymer, when the multistage polymer composition comprises still at least 10 wt % of water. No further separation between liquid phase that can contain solids or salts and solid phase takes place. All added phosphorus stays with the multistage polymer.

The phosphorus containing compound is preferably chosen from organophosphorus compound, a phosphate salt, phosphoric acid, phosphonate salts, phosphonic acid and their respective esters and mixtures thereof.

Phosphate ester general structure P(=O) (OR)$_3$, where at least one group A is an alkyl group. Phosphonates are esters of phosphonic acid and have the general formula RP(=O) (OR')$_2$, where at least one group R or R' is an alkyl group.

By organophosphorus compound in the present invention are understood compounds with P—C and P—O—C bonds.

More preferably the phosphorus containing compound is chosen from organophosphorus compound having a P—O—C bond, a phosphate salt, phosphoric acid, phosphonate salts, phosphonic acid and ester and mixtures thereof.

Phosphate salts are salts that have as anion dihydrogenophosphate ($H_2PO_4^-$), hydrogenophosphate ($HPO_4^{2-}$) or phosphate ($PO_4^{3-}$).

Phosphonate salts are salts that have as anion dihydrogenophosphonate ($H_2PO_3^-$) or hydrogenophosphate ($HPO_3^{2-}$).

The present invention relates also to the use of the multistage polymer as impact modifier in thermoplastic polymers.

The present invention relates further to a thermoplastic composition comprising the multistage polymer and a thermoplastic polymer.

In an additional aspect the present invention relates to a process for manufacturing a polymer composition comprising a multistage polymer and a thermoplastic polymer comprising the steps of
a) polymerizing by emulsion polymerization of a monomer or monomer mixture ($A_m$) to obtain during this stage one layer (A) comprising polymer (A1) having a glass transition temperature of less than 0° C.,
b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
c) coagulating the multistage polymer with an alkali metal salt,
d) washing the multistage polymer,
e) adjusting the pH value after the coagulation to a value between 5 to 10,
f) addition an aqueous solution or dispersion comprising a phosphorus containing compound wherein the phosphorus has the oxidation stage of +III or +V g) drying the multistage polymer h) mixing the multistage polymer with a thermoplastic polymer With regard to the thermoplastic polymer that is part of the thermoplastic composition according to the invention it can be chosen among poly(vinyl chloride) (PVC), chlorinated poly(vinyl chloride) (C-PVC), polyesters as for example poly (ethylene terephtalate) (PET) or poly(butylen terephtalate) (PBT) polyhydroxyalkanoates (PHA) or polylactic acid (PLA), cellulose acetate, polystyrene (PS), polycarbonates (PC), polyethylene, poly (methyl methacrylate)s (PMMA), (meth)acrylic copolymers, thermoplastic poly(methyl methacrylate-co-ethylacrylates), poly(alkylene-terephtalates), poly vinylidene fluoride poly(vinylidenchloride), polyoxymethylen (POM), semi-crystaliine polyamides, amorphous polyamides, semi-crystalline copolyamides, amorphous copolyamides, polyetheramides, polyesteramides, copolymers of styrene and acrylonitrile (SAN), and their respective mixtures or alloys. According to a preferred embodiment the thermoplastic resin composition comprises polycarbonate (PC) and/or polyester (PET or PBT) or PC or polyester alloys. The alloys for example may be PC/ABS (poly(Acrylonitrile-co-butadiene-co-styrene), PC/ASA, PC/polyester or PC/PLA.

Preferably, if the thermoplastic polymer in the thermoplastic polymer composition comprises polycarbonate (PC) and/or polyester (PET or PBT) or PC or polyester alloys the polymer (A) of the multistage polymer is chosen from isoprene homopolymers or butadiene homopolymers, isoprene-butadiene copolymers, copolymers of isoprene with at most 98 wt % of a vinyl monomer and copolymers of butadiene with at most 98 wt % of a vinyl monomer.

Concerning the polycarbonate (PC), it can be aromatic, semi-aromatic and/or aliphatic (particularly based on isosorbide).

With regard to the thermoplastic composition comprising the multistage polymer and a thermoplastic polymer, the proportions between the multistage polymer of the invention and the thermoplastic polymer are between 0.5/99.5 and 50/50, preferably between 1/98 and 30/70, more preferably between 2/98 and 20/80 and advantageously between 2/98 and 15/85.

[Methods of Evaluation]

Glass Transition Temperature

The glass transition (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Particle Size Analysis

The particle size of the primary particles after the multistage polymerization is measured with a Zetasizer Nano S90 from MALVERN. The particle size of the polymer powder is measured with Malvern Mastersizer 3000 from MALVERN.

For the estimation of weight average powder particle size, particle size distribution and ratio of fine particles a Malvern Mastersizer 3000 apparatus with a 300 mm lenses, measuring a range from 0.5-880 pm is used.

D (v, 0.5) or more short D50 is the particle size at which 50% of the sample has size less than and 50% of the sample have a size larger then that size, or in other words the equivalent volume diameter at 50% cumulative volume. This size is also known as volume median diameter that is related to the mass median diameter by the density of the particles by the density of the particles assuming a size independent density for the particles.

D (v, 0.1) or D10 is the particle size at which 10% of the sample is smaller then that size, or in other words the equivalent volume diameter at 10% cumulative volume.

D (v, 0.9) or D90 is the particle size at which 90% of the sample are smaller then that size.

EXAMPLES

Examples 1

First Stage: Polymerization of Core 1 and Core 2

To a 20 litres high-pressure reactor was charged: de-ionized water 116.5 parts, emulsifier sodium salt of dodecyl benzene sulfonic acid 0.1 parts, 1,3-butadiene 20 parts, t-dodecyl mercaptan 0.1 parts, and p-menthane hydroperoxide 0.1 parts as an initial charge. The solution was heated, with agitation, to 43° C. at which time a redox-based catalyst solution was charged (water 4.5 parts, sodium tretrapyrophosphate 0.3 parts, ferrous sulfate 0.004 parts and dextrose 0.3 parts), effectively initiating the polymerization. Then the solution was further heated to 56° C. and held at this temperature for a period of three hours.

Three hours after polymerization initiation, a second monomer charge (71 parts BD, t-dodecyl mercaptan 0.2 parts), additional emulsifier and reductant charge (de-ionized water 30.4 parts, emulsifier sodium salt of dodecyl benzene sulfonic acid 0.9 parts, dextrose 0.5 parts) and additional initiator (p-methane hydroperoxide 0.8 parts) were continuously added over eight hours. Following the completion of the second monomer addition, the remaining emulsifier and reductant charge plus initiator was continuously added over an additional five hours.

Thirteen hours after polymerization initiation, the solution was heated to 68° C., additional initiator (p-menthane hydroperoxide 0.09 parts) and Styrene (0.9 parts) were continuously added during additional 3 hours, and allowed to react until at least twenty hours had elapsed since polymerization initiation, producing butadiene corel-BD/ST gradient core2 latex (R1).

The resultant polybutadiene rubber latex (R1) contained 40.3 wt % solids and had an average particle size of about 180 nm.

Second Stage Polymerization of Shell 1 and Shell 2

Into a 3.9 litres reactor was charged 80.75 parts, on a solids basis, of polybutadiene rubber latex R1, 1.3 parts de-ionized water, and 0.004 parts sodium formaldehyde sulfoxylate. The solution was agitated, purged with nitrogen, and heated to 55° C. When the solution reached 62° C., continuously during 60 minutes 7.1 part of styrene, 0.09 parts of divinyl benzene and 0.03 part of t-butyl hydroperoxide are added. Afterwards the temperature is increased to 75° C. for 40 minutes. In batch, a mixture of 1.4 parts de-ionized water, 0.003 parts sodium formaldehyde sulfoxylate is added, then continuously 10.5 parts methyl methacrylate, 0.13 parts de divinyl benzene and 0.04 parts t-butyl hydroperoxide initiator were added over 30 minutes. Thirty minutes after the previous addition 0.1 parts t-butyl hydroperoxide were added to the reactor at once, followed by a hold period of 60 minutes.

Following the 60-minute hold period, a stabilization emulsion was added to the graft copolymer latex. The stabilization emulsion was prepared by mixing 5.4 parts de-ionized water (based on graft copolymer mass), 0.1 parts sodium salt of dodecyl benzene sulfonic acid and 0.38 parts octadecyl 3,5-di-tert-butyl-4-hydroxyhydrocinnamate.

The resultant core shell latex (E1) had an average particle site of about 190 nm.

Example of Coagulation

In a jacketed vessel of 3 L, equipped with a stirrer is put successively 500 g of latex of core-shell particles for having a solid content of 14.1%. Under stirring at 300 r/min., the heat of the latex dispersion is raised at 50° C. and then injected the solution of salt (27.1 g of sodium chloride in 245 mL of demineralized water). Coagulation occurs very rapidly. After 15 min., at 50° C. under stirring, the temperature is increased up to 85° C. and maintained for further 30 min. at this temperature. Then it is cooled down to 30° C. Subsequently, the coagulated material was filtered on centrifuge, washed with de-ionized water and filtered to produce a powder, P1.

Addition of Phosphate Buffer Solution

In a 2 litres calibrated flask is put 750 g of graft copolymer (solid content 60 wt %) P1 and are added 99 mL of a aqueous solution of $Na_2HPO_4$ (disodium hydrogen phosphate) and $KH_2PO_4$ (potassium dihydrogeno phosphate) comprising expressed in phosphorus concentration of 2.97 mg/ml, for being between 6 and 7.5 and preferably between 6 and 7 (neutral pH).

Drying

The powder PP1 is put in a ventilated oven during 48 h at 50° C. and recovered after complete drying.

Example 2 (Comparative)

Example 1 is repeated until the powder P1 at the end of the coagulation. No phosphate buffer solution is added. The powder is dried as in example 1.

Example 3 (Comparative)

Example 1 is repeated concerning the synthesis but the coagulation is made with magnesium sulphate (MgSO4). An aqueous solution of $Na_2HPO_4$ (disodium hydrogeno phosphate) is added. The powder is dried as in example 1.

Example 4 (Comparative)

Example 1 is repeated concerning the synthesis but the coagulation is made with calcium chloride ($CaCl_2$). An aqueous solution of $Na_2HPO_4$ (disodium hydrogeno phosphate) is added. The powder is dried as in example 1.

TABLE 1 recovering conditions by coagulation

| Example | Coagulating agent | pH adjustment at the end to obtain neutral pH |
|---|---|---|
| Example 1 | NaCl | Yes, with $Na_2HPO_4$ and $KH_2PO_4$ solution |
| Example 2 | NaCl | no |
| Example 3 | $MgSO_4$ | Yes, with $Na_2HPO_4$ |
| Example 4 | $CaCl_2$ | Yes, with $Na_2HPO_4$ |

The composition of example 1 comprises less than 9 ppm of $Ca2+$ and less than 5 ppm of iron ions. The composition of comparative example 2 comprises less than 350 ppm of P. The compositions of comparative example 3 and 4 comprise more than 30 ppm of earth alkali metal cations.

The dry multistage polymer powders from examples 1 to 4 are compounded with polycarbonate at 5 wt % for producing compounds 1 to 4.

Preparation of the impact modified compound compositions, the respective impact modifier powders from examples 1 to 4 are mixed with the thermoplastic resin polycarbonate Lexan ML5221 from SABIC (at 5 wt % with the help of an extruder type Clextral (double diameter 25 mm, length 700 mm) using temperatures between from 100° C. up to 320° C. depending on the respective zones throughout the whole extruder.

The respective obtained compounds are heat aged at 120° C. The optical properties of the compounds are evaluated. The color change is observed by measuring the parameter b*. The b* value is used to characterize the principal yellowing off the samples. The b* value measures the blue and the yellow of the colour. Colours tending toward the yellow have a positive b* value while those tending toward the blue have a negative b* value. The b* values is measured using a colorimeter (especially according to the ASTM E 308 standard). The colour change is observed as a function of time: samples kept at 120° C. for 4 days.

If the initial color is close zero it is considered that the thermoplastic composition comprising the impact modifiers of the invention is acceptable. The b* value should not larger than 10 after 4 days of thermal aging.

TABLE 2 optical properties expressed by b* of impact modified PC composition with respective multistage polymers

| Example | b* initial | b* after 4 days at 120° C. |
|---|---|---|
| Example 1 | −0.63 | 3.5 |
| Example 2 | −0.6 | 7.2 |
| Example 3 | −2.4 | 2.3 |
| Example 4 | 0.1 | 4.5 |

TABLE 3

Izod Impact strength of impact modified polycarbonate composition with respective multistage polymers

| | IZOD impact strength [kJ/m2] at | |
|---|---|---|
| Example | 23° C. | −30° C. |
| Example 1 | 49.2 | 31.8 |
| Example 2 | 44.0 | 31.7 |
| Example 3 | 35.3 | 17.4 (−20° C.) |
| Example 4 | 52.0 | 32.3 |

The composition according to the invention (example 1) possesses satisfying thermal aging stability and impact performance at ambient temperature and at −30° C. The other compositions (comparative examples) possess either no satisfying thermal aging stability or no satisfying impact performance at ambient temperature and at −30° C. or the two at the same time.

The invention claimed is:

1. A process for manufacturing a polymer composition comprising a multistage polymer comprising the steps of:
    a) polymerizing by emulsion polymerization of a monomer or monomer mixture ($A_m$) to obtain during this stage one layer (A) comprising polymer (A1) having a glass transition temperature of less than 0° C.,
    b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
    c) coagulating the multistage polymer with an alkali metal salt,
    d) washing the multistage polymer,
    e) adjusting the pH value after the coagulation to a value between 5 to 10, and
    f) addition of an aqueous solution or dispersion comprising a phosphorus containing compound wherein the phosphorus has the oxidation stage of +III or +V,
wherein said polymer composition comprises at least 350 ppm of phosphorus and less than 30 ppm of earth alkali metals as traces or impurities.

2. The process according to claim 1, wherein step a) and b) use in the emulsion polymerization a surfactant chosen from the group consisting of an anionic surface-active agent.

3. The process according to claim 1 wherein said earth alkali metal salt is a sodium or potassium salt.

4. The process according to claim 1 comprising an additional step g):
    drying the polymer composition.

5. The process according to claim 1 wherein said polymer composition comprises at most 2000 ppm of phosphorus that has the oxidation stage of +III or +V.

6. The process according to claim 1 wherein said polymer composition comprises between 350 ppm and 2000 ppm of phophorus that has the oxidation stage of +III or +V.

7. The process according to claim 1 wherein no multivalent cations are voluntarily added.

8. The process according to claim 1 wherein initiator does not contain any voluntarily added earth alkali metals.

9. The process according to claim 1 wherein no earth alkali metals either as ions or in form of salts are voluntarily added during the process.

10. The process according to claim 1 wherein earth alkali metals as traces or minor impurity present less than 9 ppm of the multistage polymer composition.

11. The process according to claim 1 wherein said multivalent cations present less than 50 ppm of the multistage polymer composition.

12. The process according to claim 1 wherein the multivalent cations present less than 20 ppm of the multistage polymer composition.

13. The process according to claim 1 having an adjusted pH after coagulation between 6 and 9.

14. The process according to claim 1 wherein the phosphorous containing compound is chosen from the group consisting of organophosphorus compound, a phosphate salt, phosphoric acid, phosphonate salts, phosphonic acid and their respective esters and mixtures thereof.

15. The process according to claim 1 wherein in step f) the aqueous solution or dispersion comprising a phosphorus containing compound wherein the phosphorus has the oxidation stage of +III or +V is added by washing the multistage polymer which contains less than 60 wt % of water with said aqueous solution or dispersion comprising a phosphorus containing compound wherein the phosphorus has the oxidation stage of +III or +V.

16. The process according to claim 1 wherein in step f) the aqueous solution or dispersion comprising a phosphorus containing compound wherein the phosphorus has the oxidation stage of +III or +V is added on the wet cake after coagulation step and filtration step.

17. The process according to claim 1 wherein in step f) the aqueous solution or dispersion comprising a phosphorus containing compound wherein the phosphorus has the oxidation stage of +III or +V is added during drying step of the multistage polymer, when the multistage polymer composition comprises still at least 10 wt % of water.

18. A process for manufacturing a polymer composition comprising a multistage polymer and a thermoplastic polymer comprising the steps of:
   a) polymerizing by emulsion polymerization of a monomer or monomer mixture ($A_m$) to obtain during this stage one layer (A) comprising polymer (A1) having a glass transition temperature of less than 0° C.,
   b) polymerizing by emulsion polymerization in presence of the polymer obtained in step a) of a monomer or monomer mixture ($B_m$) to obtain during this subsequent stage a layer (B) comprising a polymer (B1) having a glass transition temperature of at least 45° C.,
   c) coagulating the multistage polymer with an alkali metal salt,
   d) washing the multistage polymer,
   e) adjusting the pH value after the coagulation to a value between 5 to 10,
   f) addition of an aqueous solution or dispersion comprising a phosphorus containing compound wherein the phosphorus has the oxidation stage of +III or +V,
   g) drying the multistage polymer, and
   h) mixing the multistage polymer with a thermoplastic polymer wherein said polymer composition comprises at least 350 ppm of phosphorus and less than 30 ppm of earth alkali metals as traces or impurities.

19. A thermoplastic polymer composition comprising the polymer composition obtained by the process according to claim 1.

* * * * *